(12) United States Patent
Kuwano et al.

(10) Patent No.: US 7,023,165 B2
(45) Date of Patent: Apr. 4, 2006

(54) STEPPING MOTOR CONTROL APPARATUS

(75) Inventors: Yoshifumi Kuwano, Kiryu (JP); Hiroaki Taka, Kiryu (JP); Akio Takemori, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 11/094,281

(22) Filed: Mar. 31, 2005

(65) Prior Publication Data

US 2005/0218859 A1    Oct. 6, 2005

(30) Foreign Application Priority Data

Apr. 2, 2004    (JP) ............... 2004-109906

(51) Int. Cl.
*G05B 19/40*    (2006.01)

(52) U.S. Cl. ............ 318/685; 318/696; 318/700; 318/701; 318/714; 318/720; 318/723

(58) Field of Classification Search ............... 318/685, 318/696, 700, 701, 714, 720, 721, 722, 723, 318/724, 138, 254, 139
See application file for complete search history.

(56) References Cited

U.S. PATENT DOCUMENTS 4,631,657 A * 12/1986 Hill et al. ............ 700/63
5,258,830 A * 11/1993 Schmidt et al. ......... 348/744

FOREIGN PATENT DOCUMENTS

| DE | 4242067 A1 | 6/1994 |
|---|---|---|
| JP | 5-207799 A | 8/1993 |
| JP | 2003-47293 A | 2/2003 |

OTHER PUBLICATIONS

Wang Panhai; XU Dianguo; Shi Jingzhuo; "Hybrid stepping motor position servo system with on-line trained fuzzy neural network controller" 28th Annual Conference of the Industrial Electronics Society, IEEE 2002, vol. 3, Nov. 2002 pp. 2137-2140, XP002338863.
Kefsi Laid; Xu Dianguo; Shi Jingzhuo; "Vector control of hybrid stepping motor position servo system using neural network control" The 27th Annual Conference of the IEEE Industrial Electronics Society, 2001. IECON '01. vol. 2, Nov. 2001, pp. 1504-1508, XP002338864.

* cited by examiner

*Primary Examiner*—Karen Masih
(74) *Attorney, Agent, or Firm*—Birch, Stewart, Kolasch & Birch, LLP

(57) ABSTRACT

A stepping motor control apparatus in accordance with the present invention comprises: a current detection unit that detects phase currents flowing into a stepping motor; an equivalent model-of-motor arithmetic unit that includes a coefficient multiplication block which performs multiplication using a coefficient $ka'=Ts/\tau$ as a multiplier, a coefficient multiplication block which performs multiplication using a coefficient $kb'=\tau/(Ts+\tau)$ as a multiplier, and a coefficient multiplication block which performs multiplication using a coefficient $kg'=I0/E0$ as a multiplier, and that calculates an estimated angle of excitation; a current control unit that controls an exciting current on the basis of the estimated angle of excitation, an angle command, and the phase currents detected by the current detection unit; and a variable voltage inverter that applies phase voltages to phase windings included in the stepping motor according to outputs of the current control unit.

4 Claims, 5 Drawing Sheets

STEPPING MOTOR CONTROL APPARATUS

BACKGROUND OF THE INVENTION

1. Field of the Invention

The present invention relates to a stepping motor control apparatus for controlling a stepping motor.

2. Description of the Prior Art

Stepping motors have prevailed as low-cost motors that control a position or a speed.

As for a stepping motor control apparatus that controls the stepping motor, when only a current flowing through the motor is monitored, neither the position of a magnetic pole in the stepping motor nor the rotating speed thereof is monitored. A loss of synchronism or vibrations may occur in the stepping motor.

Therefore, the conventional stepping motor control apparatus is provided with an angle detector that detects the position of the magnetic pole in the stepping motor.

However, the inclusion of the angle detector increases the size of the stepping motor. Moreover, the cost of manufacture increases.

Another conventional stepping motor control apparatus does not include an angle detector that detects the position of a magnetic pole. A constant relevant to a winding is set to a fixed value or a nominal value, whereby the position of the magnetic pole is calculated.

However, when a constant relevant to a winding is set to a fixed value or a nominal value, the position of a magnetic pole in a stepping motor cannot be calculated accurately. Therefore, a loss of synchronism or vibrations may occur in the stepping motor.

SUMMARY OF THE INVENTION

An object of the present invention is to provide a stepping motor control apparatus that neither allows occurrence of a loss of synchronism or vibrations in a stepping motor nor increases the size of the stepping motor and that requires a low cost of manufacture.

According to the present invention, there is provided a stepping motor control apparatus comprising: a current detection means for detecting phase currents flowing into a stepping motor; an equivalent model-of-motor arithmetic means that includes a coefficient multiplication means which performs multiplication using a coefficient $ka'=Ts/\tau$ as a multiplier, a coefficient multiplication means which performs multiplication using a coefficient $kb'=\tau/(Ts+\tau)$ as a multiplier, and a coefficient multiplication means which performs multiplication using a coefficient $kg'=I0/E0$ as a multiplier, and that calculates an estimated angle of excitation; a current control means for controlling an exciting current on the basis of the estimated angle of excitation, an angle command, and the phase currents detected by the currents detection means; and a variable voltage inverter that applies phase voltages to phase windings included in the stepping motor according to outputs of the current control means.

In the stepping motor control apparatus, the estimated angle of excitation calculated by the equivalent model-of-motor arithmetic means assumes a value very close to a value indicating the position of a magnetic pole in the stepping motor. Therefore, occurrence of a loss of synchronism or vibrations in the stepping motor can be effectively prevented. Moreover, an angle detector that detects the position of the magnetic pole in a stepping motor need not be included. The size of the stepping motor will not increase, and the cost of manufacture will be low.

DESCRIPTION OF THE PREFERRED EMBODIMENTS

Figure 1:
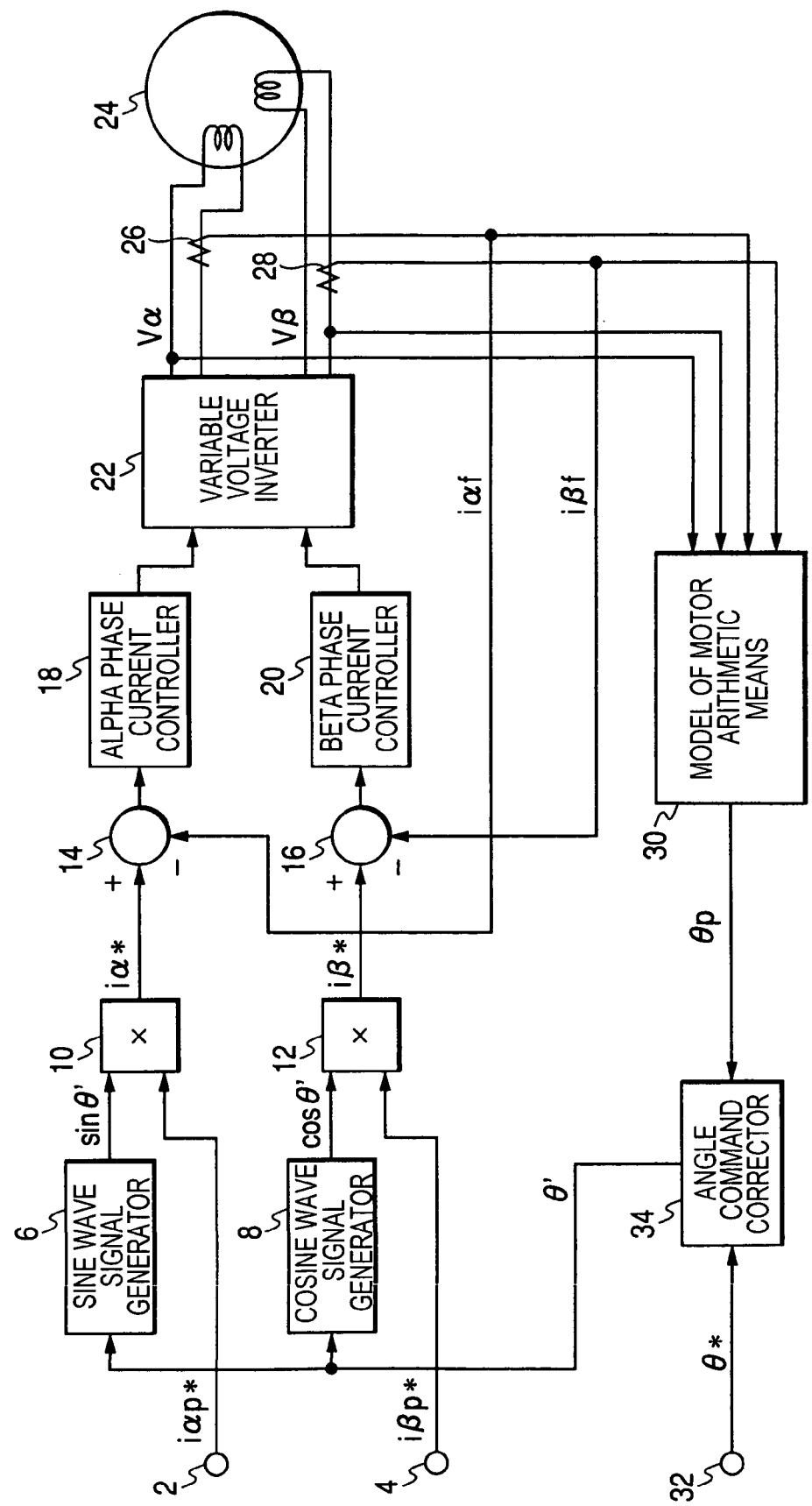
FIG. 1 shows a stepping motor control apparatus in accordance with the present invention.
Figure 2:
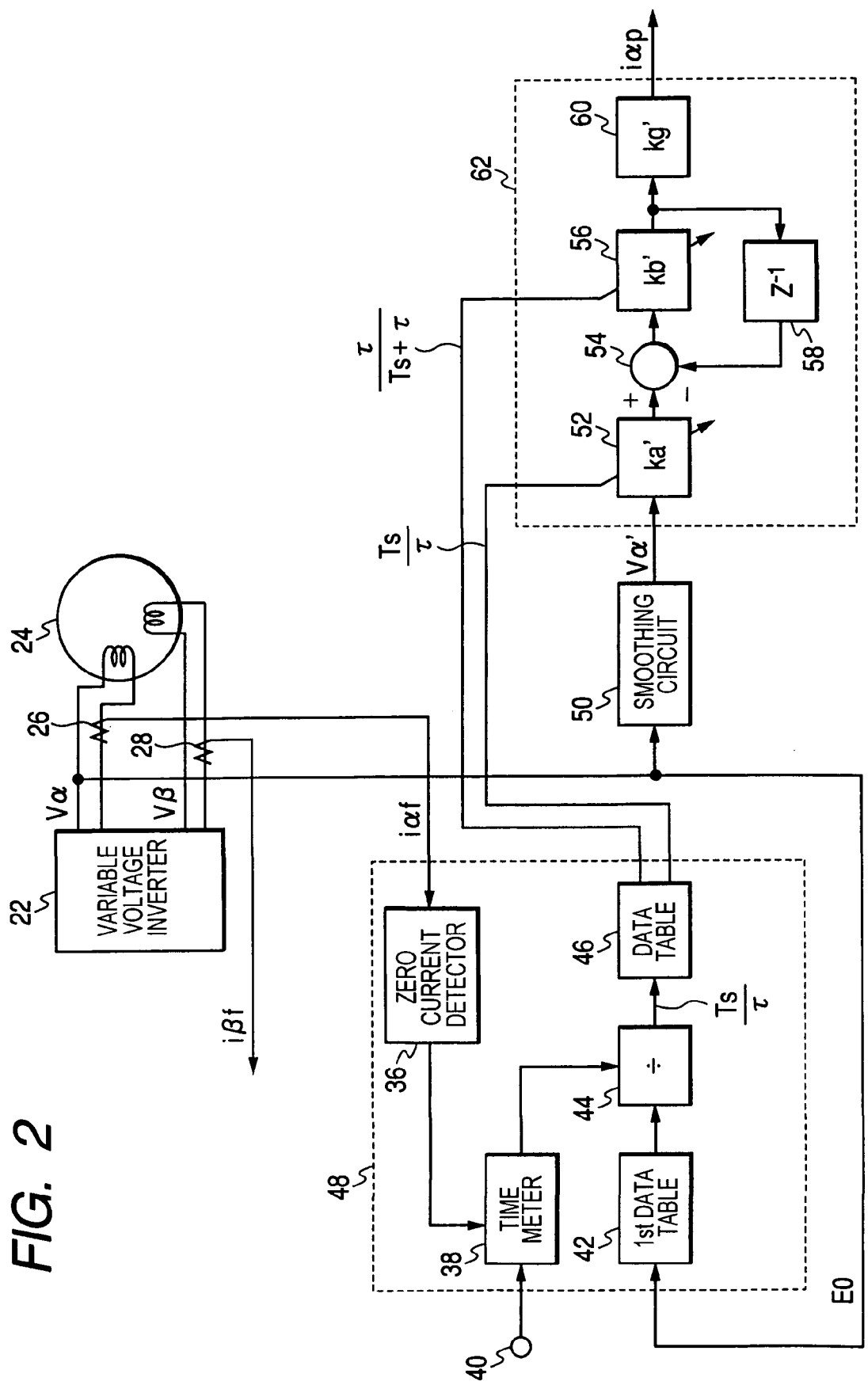
FIG. 2 shows part of the stepping motor control apparatus shown in FIG. 1.

Referring to FIG. 1 and FIG. 2, a stepping motor control apparatus in accordance with the present invention will be described below. An alpha-phase current amplitude command $i\alpha p^*$ is received through an alpha-phase current command input terminal 2, and a beta-phase current amplitude command $i\beta p$ is received through a beta-phase current command input terminal 4. A sine-wave signal generator 6 produces a sine-wave signal $\sin \theta'$ on the basis of a corrected angle of excitation $\theta'$ sent from an angle command corrector 34. A cosine-wave signal generator 8 produces a cosine-wave signal $\cos \theta'$ on the basis of the corrected angle of excitation $\theta'$. A multiplier 10 multiplies the sine-wave signal $\sin \theta'$ by the alpha-phase current amplitude command $i\alpha p^*$ so as to produce an alpha-phase current command $i\alpha^*$. A multiplier 12 multiplies the cosine-wave signal $\cos \theta'$ by the beta-phase current amplitude command $i\beta p^*$ so as to produce a beta-phase current command $i\beta^*$. A comparator 14 compares a detected alpha-phase current $i\alpha f$ with the alpha-phase current command $i\alpha^*$, and a comparator 16 compares a detected beta-phase current $i\beta f$ with the beta-phase current command $i\beta^*$. An alpha-phase current controller 18 controls an alpha-phase exciting current, which flows into a stepping motor 24, on the basis of an output of the comparator 14. A beta-phase current controller 20 controls a beta-phase exciting current, which flows into the stepping motor 24, on the basis of an output of the comparator 16. The sine-wave signal generator 6, cosine-wave signal generator 8, alpha-phase current controller 18, beta-phase current controller 20, etc. constitute a current control means for controlling an exciting current on the basis of the estimated angle of excitation $\theta p$, angle command $\theta^*$, detected alpha-phase current $i\alpha f$, and detected beta-phase current $i\beta f$.

A variable voltage inverter 22 applies an alpha-phase voltage $V\alpha$, which causes a current corresponding to the alpha-phase current command $i\alpha^*$ to flow through an alpha-phase winding included in the stepping motor 24, according to the outputs of the alpha-phase current controller 18 and beta-phase current controller 20. Moreover, a beta-phase voltage $V\beta$ causing a current, which corresponds to the beta-phase current command $i\beta^*$, to flow through a beta-phase winding included in the stepping motor 24 is applied according to an output of the beta-phase current controller 20.

A current detector 26 detects an alpha-phase current $i\alpha f$ flowing into the stepping motor 24, and a current detector 28 detects a beta-phase current $i\beta f$ flowing into the stepping motor 24. The current detectors 26 and 28 constitute a current detection means for detecting phase currents flowing into the stepping motor 24. An equivalent model-of-motor arithmetic means 30 uses the detected alpha-phase current iαf, detected beta-phase current iβf, alpha-phase voltage Vα, and beta-phase voltage Vβ to calculate an estimated angle of excitation θp. An angle command θ* is received through an angle command input terminal 32. An angle command corrector 34 corrects the angle command θ* on the basis of the estimated angle of excitation θp so as to suppress vibrations, and produces a corrected angle of excitation θ'. For example, the angle command corrector 34 calculates the corrected angle of excitation θ' according to θ'=θ*+k(θ*−θp).

Figure 3:
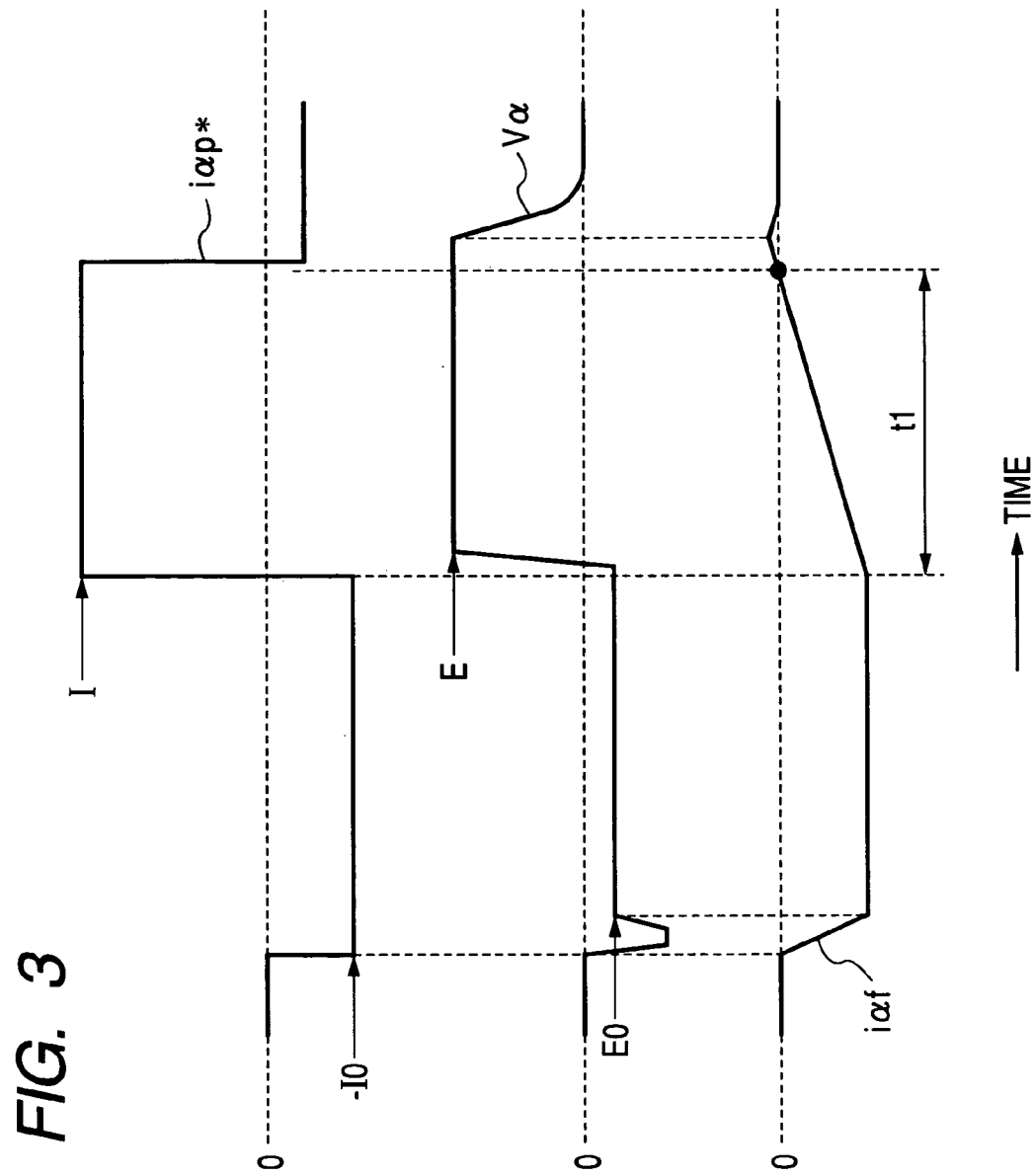
FIG. 3 is an explanatory diagram concerning actions to be performed by the stepping motor control apparatus shown in FIG. 1.

When the detected alpha-phase current iαf becomes zero, a zero current detector 36 provides a detected zero-current signal. Immediately after the alpha-phase current amplitude command iαp* is, as shown in FIG. 3, changed from −I0 to a maximum current I of a different polarity, a time meter activation signal is applied to a terminal 40. Specifically, when the variable voltage inverter 22 applies a voltage making the alpha-phase current iα constant, immediately after the means value of the output of the variable voltage inverter 22 is changed to a voltage value of a different polarity, the time meter activation signal is applied to the terminal 40. A time meter 38 measures a time t1 from the instant it receives the time meter activation signal to the instant it receives the detected zero current signal. A value calculated as Ts·ln{(E0/E)+1} is retrieved from a first data table 42 on the basis of an initially-applied voltage E0 with which an initial current I0 is conducted, where Ts denotes a sampling cycle (fixed value), and E denotes a maximum applied voltage. A divider 44 divides Ts·ln{(E0/E)+1} by the time t1 so as to calculate Ts/τ where the resistance of a winding is R=E0/I0, an inductance is L, and the time constant of the winding is τ=L/R. From a second data table 46, a coefficient ka'=Ts/τ and a coefficient kb'=τ/(Ts+τ) are retrieved based on Ts/τ. The data tables 42 and 46, etc. constitute an alpha-phase adjustment means 48. The alpha-phase adjustment means 48 estimates the coefficients ka' and kb' on the basis of a time from the instant the initially applied voltage E0 and alpha-phase current amplitude command iαp* are changed to voltage of different polarities to the instant the detected phase current iαf becomes zero.

A smoothing circuit 50 smoothes the alpha-phase voltage Vα so as to provide a smoothed alpha-phase voltage Vα'. A coefficient multiplication means 52 multiplies the smoothed alpha-phase voltage Vα' by the coefficient ka'. An addition means 54 subtracts an output of a delay means 58 from an output of the coefficient multiplication means 52. A coefficient multiplication means 56 multiplies an output of the addition means 54 by the coefficient kb'. The delay means 58 delays an output of the coefficient multiplication means 56. A coefficient multiplication means 60 multiplies an output of the coefficient multiplication means 56 by a coefficient kg'=I0/E0. The value of the coefficient kg' is determined in advance, that is, estimated based on the alpha-phase voltage Vα and detected alpha-phase current iαf. Herein, the variable voltage inverter 22 applies the alpha-phase voltage Vα so that the alpha-phase current iα will remain constant. For example, the coefficient kg' is determined based on the alpha-phase voltage Vα and detected alpha-phase current iαf that are, as shown in FIG. 3, detected with the alpha-phase current amplitude command iαp* set to −I0. The coefficient multiplication means 52, 56, and 60, etc. constitute an equivalent model-of-alpha-phase portion arithmetic means 62. The equivalent model-of-alpha-phase portion arithmetic means 62 is realized with a microcomputer and provides an estimated alpha-phase current iαp.

Moreover, a beta-phase adjustment means (not shown) having the same composition as the alpha-phase adjustment means 48 is included, and the alpha-phase adjustment means 48 and beta-phase adjustment means constitute a coefficient determination means for determining the coefficients ka' and kb'. Moreover, an equivalent model-of-beta-phase portion arithmetic means (not shown) that has the same composition as the equivalent model-of-alpha-phase portion arithmetic means 62 is included for providing an estimated beta-phase current iβp. An estimated angle-of-excitation arithmetic means (not shown) is included for calculating an estimated angle of excitation θp on the basis of the estimated alpha-phase current iαp, estimated beta-phase current iβp, alpha-phase voltage Vα, and beta-phase voltage Vβ. The equivalent model-of-motor arithmetic means 30 includes the coefficient determination means, equivalent model-of-alpha-phase portion arithmetic means 62, equivalent model-of-beta-phase portion arithmetic means, and estimated angle-of-excitation arithmetic means.

Figure 4:
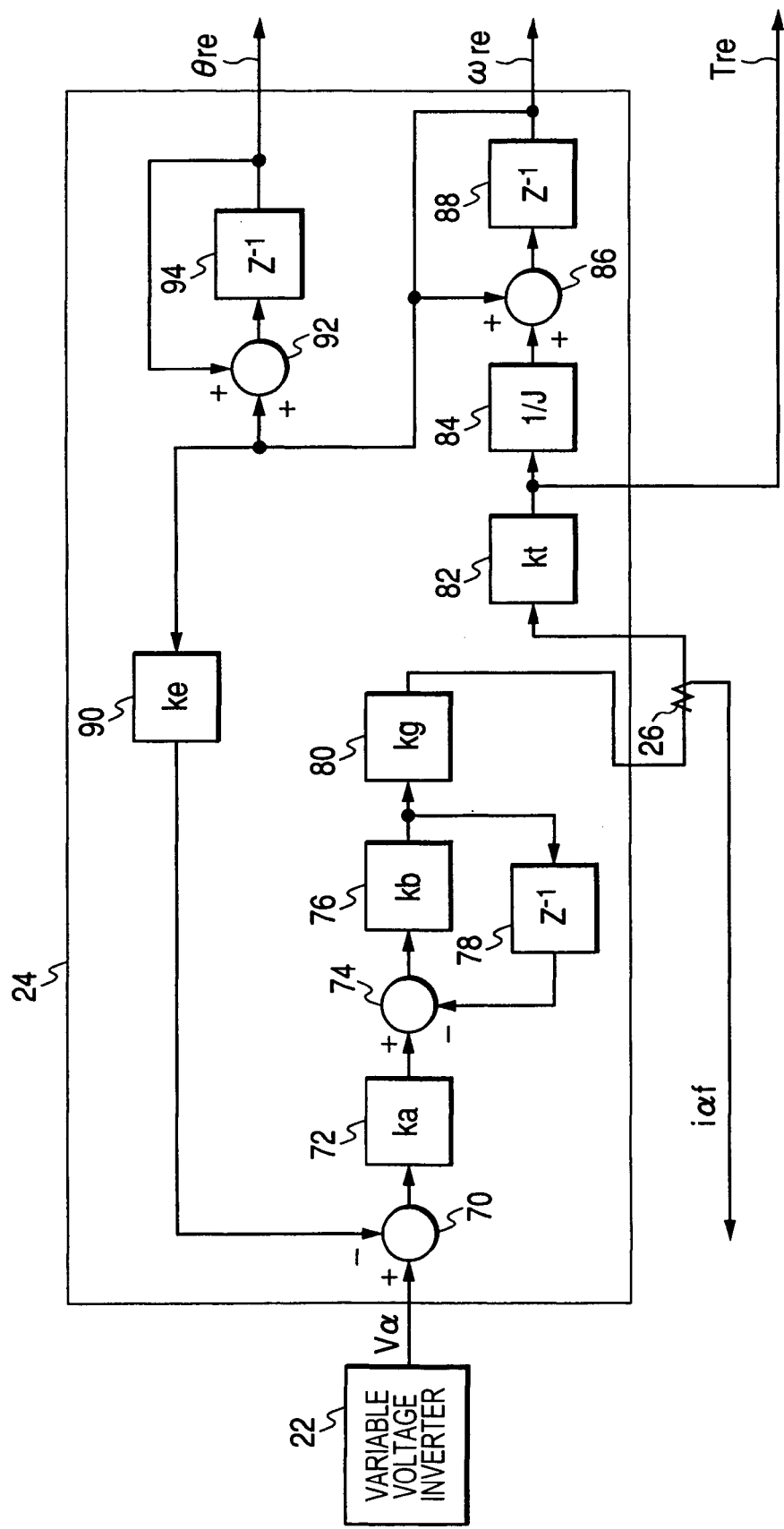
FIG. 4 shows a model equivalent to the stepping motor.

FIG. 4 shows a model equivalent to a stepping motor. Referring to FIG. 4, there are shown a coefficient multiplier 72 that performs multiplication using a coefficient ka given by an expression (1) as a multiplier; a coefficient multiplier 76 that performs multiplication using a coefficient kb given by an expression (2) as a multiplier; a coefficient multiplier 80 that performs multiplication using a coefficient kg given by an expression (3) as a multiplier; adders 70, 74, 86, and 92, delay circuits 78, 88, and 94; a coefficient multiplier 82 that performs multiplication using a constant kt of a torque as a multiplier; a multiplier 84 that performs multiplication using an inverse number of a moment of inertia J as a multiplier; and a coefficient multiplier 90 that performs multiplication using a constant ke of an induced voltage as a multiplier.

$$ka = Ts/\tau = Ts/t \cdot \ln\{(E0/E)+1\} \quad (1)$$

$$kb = \tau/(Ts+\tau) = 1/\{1+(Ts/\tau)\} = 1/(1+ka) \quad (2)$$

$$kg = 1/R = I0/E0 \quad (3)$$

As for the equivalent model shown in FIG. 4, when the stepping motor 24 is halted, since the motor speed ωre is zero, assuming that an applied voltage is E, a current flowing through a winding is i, an inductance is L, and a resistance offered by the winding is R, a relationship expressed below is established.

$$L \cdot di/dt + Ri = E \quad (4)$$

Assuming that an initial current is I0, when the expression (4) is solved in order to obtain the current i flowing through the winding, the following expression ensues:

$$i = E/R - \{I0+(E/R)\}e^{-R/L \cdot t} \quad (5)$$

Since τ=L/R and E0=R·I0 are established, the following expression is derived from the expression (5):

$$Ts/\tau = Ts/t \cdot \ln\{(E0/E)+1\} = ka \quad (6)$$

As mentioned above, in the alpha-phase adjustment means 48, a divider 44 divides the value Ts·ln{(E0/E)+1} by a time T1 so as to work out Ts/τ=ka'. Therefore, the coefficients ka and kb are equivalent to the coefficients ka' and kb'.

The equivalent model of a stepping motor shown in FIG. 4 comprises the coefficient multiplier 72 that performs multiplication using a coefficient ka=Ts/τ as a multiplier, the coefficient multiplier 76 that performs multiplication using a coefficient kb=τ/(Ts+τ) as a multiplier, and the coefficient multiplier 80 that performs multiplication using a coefficient kg=I0/E0 as a multiplier. On the other hand, the equivalent model-of-alpha-phase portion arithmetic means 62 comprises the coefficient multiplication means 52 that performs multiplication using the coefficient ka'=Ts/τ as a multiplier, the coefficient multiplication means 56 that performs multiplication using the coefficient kb'=τ/(Ts+τ) as a multiplier, and the coefficient multiplication means 60 that performs multiplication using the coefficient kg'=I0/E0 as a multiplier. In the stepping motor control apparatus shown in FIG. 1 and FIG. 2, the estimated alpha-phase current iαp calculated by the equivalent model-of-alpha-phase portion arithmetic means 62 is very close to the alpha-phase current iα. The same applies to the estimated beta-phase current iβp. Consequently, the estimated angle of excitation θp calculated by the equivalent model-of-motor arithmetic means 30 assumes a value very close to a value indicating the position of a magnetic pole in the stepping motor 24. Occurrence of a loss of synchronism or vibrations in the stepping motor 24 can be effectively prevented. Moreover, since the equivalent model-of-motor arithmetic means 30 calculates the estimated angle of excitation θp, an angle detector for detecting the position of the magnetic pole in the stepping motor 24 need not be included. The size of the stepping motor 24 will therefore not get larger, and the cost of manufacture will be low.

Figure 5:
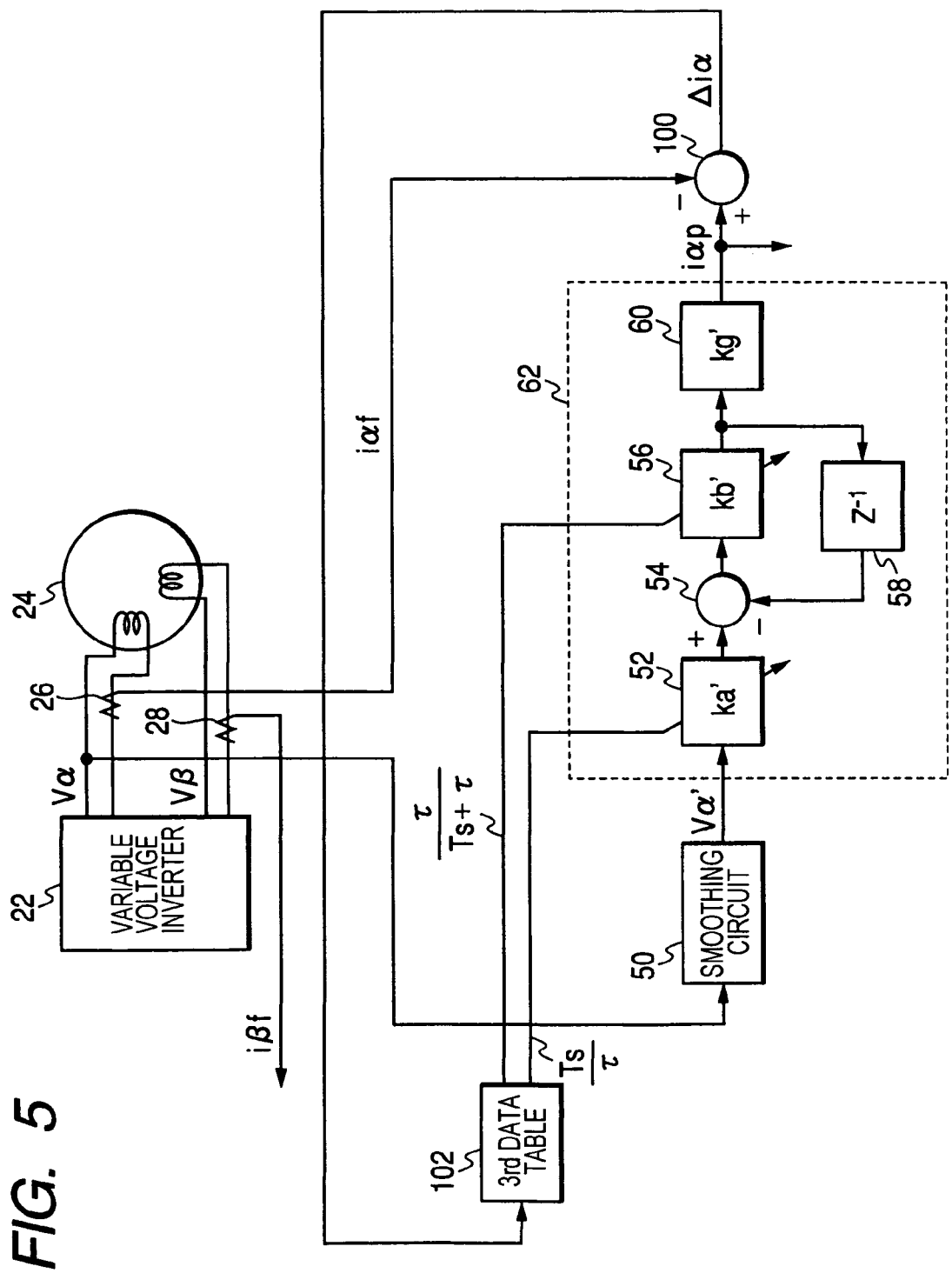
FIG. 5 shows part of another stepping motor control apparatus in accordance with the present invention.

FIG. 5 is an explanatory diagram concerning another stepping motor control apparatus in accordance with the present invention. A comparator 100 calculates a deviation Δiα of a detected alpha-phase current iαf from an estimated alpha-phase current iαp that is an output of the equivalent model-of-alpha-phase portion arithmetic means 62 (coefficient multiplication means 60). Coefficients ka' and kb' that minimize the current deviation Δiα are sequentially retrieved from a third data table 102. A fourth data table (not shown) having the same composition as the third data table 102 is included in relation to a beta-phase current. The third and fourth data tables constitute a coefficient determination means that sequentially provides the coefficients ka' and kb' which minimize the current deviations. Moreover, an equivalent model-of-beta-phase portion arithmetic means (not shown) having the same composition as the equivalent model-of-alpha-phase portion arithmetic means 62 is included for providing an estimated beta-phase current iβp. An estimated angle-of-excitation arithmetic means (not shown) is included for calculating an estimated angle of excitation θp on the basis of the estimated alpha-phase current iαp, estimated beta-phase current iβp, alpha-phase voltage Vα, and beta-phase voltage Vβ. The equivalent model-of-motor arithmetic means 30 includes the coefficient determination means, equivalent model-of-alpha-phase portion arithmetic means 62, equivalent model-of-beta-phase portion arithmetic means, and estimated angle-of-excitation arithmetic means.

As for the stepping motor control apparatus shown in FIG. 5, the estimated angle of excitation θp calculated by the equivalent model-of-motor arithmetic means 30 assumes a value very close to a value indicating the position of a magnetic pole in the stepping motor 24. Occurrence of a loss of synchronism or vibrations in the stepping motor 24 can be effectively prevented. Moreover, the equivalent model-of-motor arithmetic means 30 calculates the estimated angle of excitation θp. This obviates the necessity of an angle detector that detects the position of the magnetic pole in the stepping motor 24. The size of the stepping motor 24 will not get larger and the cost of manufacture will be low.

The present invention can be applied not only to a stepping motor control apparatus that is intended to control a position but also to a stepping motor control apparatus that controls the speed of a stepping motor without the use of a sensor or a stepping motor control apparatus having the capability to suppress vibrations.

What is claimed is:

1. A stepping motor control apparatus comprising:
a current detection means for detecting phase currents flowing into a stepping motor;
an equivalent model-of-motor arithmetic means that includes a coefficient multiplication means which performs multiplication using a coefficient ka'=Ts/τ as a multiplier, a coefficient multiplication means which performs multiplication using a coefficient kb'=τ/(Ts+τ) as a multiplier, and a coefficient multiplication means which performs multiplication using a coefficient kg'=I0/E0 as a multiplier, where an initially applied voltage is E0, an initial current flowing responsively to application of the initially applied voltage E0 is I0, a resistance of a winding is R=E0/I0, a sampling cycle is Ts, an inductance is L, and a time constant of the winding is τ=L/R, and that calculates an estimated angle of excitation;
a current control means for controlling an exciting current on the basis of the estimated angle of excitation, an angle command, and the phase currents detected by the current detection means; and
a variable voltage inverter that applies phase voltages to phase windings included in the stepping motor according to outputs of the current control means.

2. The stepping motor control apparatus according to claim 1, wherein the coefficient ka' and coefficient kb' are estimated based on a time from the instant the initially applied voltage E0 and a phase current amplitude command are changed to voltage of different polarities to the instant the detected phase current becomes zero.

3. The stepping motor control apparatus according to claim 1, wherein the constant kg' is estimated based on the phase voltage, which the variable voltage inverter applies so as to keep the phase current constant, and the detected phase current.

4. The stepping motor control apparatus according to claim 1, further comprising: a comparator that calculates a deviation of the detected phase current from an estimated phase current that is an output of the coefficient multiplication means which performs multiplication using the coefficient kg' as a multiplier; and a coefficient determination means that sequentially provides the coefficients ka' and kb' which minimize the current deviations.

* * * * *